Patented Feb. 22, 1927.

1,618,494

UNITED STATES PATENT OFFICE.

ANTON EDUARD VAN ARKEL AND JAN HENDRIK DE BOER, OF EINDHOVEN, NETHERLANDS, ASSIGNORS TO N. V. PHILIPS' GLOEILAMPENFABRIEKEN, OF EINDHOVEN, NETHERLANDS.

PROCESS FOR DISSOLVING A MIXTURE OF HAFNIUM AND ZIRCONIUM PHOSPHATES AND FOR SEPARATING HAFNIUM AND ZIRCONIUM.

No Drawing. Original application filed May 11, 1925, Serial No. 29,561, and in the Netherlands June 6, 1924. Divided and this application filed January 4, 1926. Serial No. 79,253.

This invention relates to a process of dissolving hafnium and zirconium phosphates and of separating hafnium and zirconium in the solution thus obtained.

According to the invention the process may consist in dissolving a mixture of hafnium and zirconium phosphates in a medium containing concentrated sulphuric acid.

According to the invention hafnium and zirconium oxide can be precipitated out of the obtained solution of the hafnium and zirconium salts with the aid of a base or a basically reacting substance of sufficiently high concentration of hydroxylions.

According to the invention a mixture of hafnium and zirconium compounds is separated by starting from the solution of said hafnium and zirconium salts in a medium containing concentrated sulphuric acid. This solution can be separated in many known ways. According to the invention very favourable results are obtained by fractional precipitation of the solution preferably with the aid of water. The invention may be more clearly understood with reference to some examples:

100 cubic centimetres of a suspension of a mixture of hafnium and zirconium phosphate, containing about 0,6 gramme of metal, dissolves entirely when 200 cubic centimetres of concentrated sulphuric acid are added. If the solution thus obtained is poured out into so large a quantity of basically reacting substance that the liquid shows an alkaline reaction until the end, a deposit of a mixture of hafnium and zirconium oxide is obtained.

If 100 cubic centimetres of a suspension of a mixture of hafnium and zirconium phosphate containing 4% of hafnium metal relatively to the zirconium metal are dissolved in 200 cubic centimetres of concentrated sulphuric acid and if 30 cubic centimetres of water are added to the thus obtained solution having a specific weight of 1,68, a deposit will be isolated after some days. This deposit has been found to contain 10% of hafnium relatively to zirconium. If again 30 cubic centimetres of water are added to the solution being left, the obtained precipitate is found to contain 6% of hafnium relatively to zirconium. The specific weight of the solution has now become 1,48. If this solution is diluted with an equal quantity of water the precipitate formed is found to contain only 2% of hafnium relatively to zirconium. The deposit which is obtained by precipitating the remaining solution with the aid of sodium-hydrate is found to be free of hafnium.

What we claim is:

1. A process for converting a mixture of hafnium and zirconium phosphates, characterized in that said hafnium and zirconium salts are introduced into a medium containing concentrated sulphuric acid.

2. A process for converting a mixture of hafnium and zirconium phosphates, characterized in that said hafnium and zirconium salts are introduced into a medium containing concentrated sulphuric acid and that from said solution hafnium and zirconium oxide are precipitated by means of a basically reacting substance having a sufficiently high concentration of hydroxylions.

3. A process of converting a mixture of hafnium and zirconium phosphates, characterized in that said hafnium and zirconium salts are introduced into a medium containing concentrated sulphuric acid and that from said solution hafnium and zirconium oxide are precipitated by means of a base.

4. A process of separating hafnium and zirconium compounds characterized by starting with a solution that can be obtained by bringing a mixture of hafnium and zirconium phosphates in a medium that contains concentrated sulphuric acid and submitting said solution to fractional separation.

5. A process of separating hafnium and zirconium compounds, characterized by starting with a solution that can be obtained by bringing a mixture of hafnium and zirconium phosphates in a medium that contains concentrated sulphuric acid and submitting said solution to fractional precipitation.

In testimony whereof we affix our signatures at the city of Eindhoven this 7th day of December A. D. 1925.

ANTON EDUARD VAN ARKEL.
JAN HENDRIK DE BOER.